United States Patent
Zhao et al.

(10) Patent No.: US 11,458,614 B2
(45) Date of Patent: *Oct. 4, 2022

(54) 2 DEGREE-OF-FREEDOMS DECOUPLING PARALLEL MECHANISM

(71) Applicant: SHENZHEN INSTITUTES OF ADVANCED TECHNOLOGY, Shenzhen (CN)

(72) Inventors: Guoru Zhao, Shenzhen (CN); Yongfeng Wang, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 424 days.

This patent is subject to a terminal disclaimer.

(21) Appl. No.: 16/610,524

(22) PCT Filed: Jun. 9, 2017

(86) PCT No.: PCT/CN2017/087679
§ 371 (c)(1),
(2) Date: Nov. 4, 2019

(87) PCT Pub. No.: WO2018/223362
PCT Pub. Date: Dec. 13, 2018

(65) Prior Publication Data
US 2020/0147786 A1     May 14, 2020

(51) Int. Cl.
*B25J 9/00* (2006.01)

(52) U.S. Cl.
CPC .......... *B25J 9/0054* (2013.01); *B25J 9/0045* (2013.01); *B25J 9/0072* (2013.01)

(58) Field of Classification Search
CPC ........ B25J 9/003; B25J 9/0045; B25J 9/0054; B25J 9/0072
See application file for complete search history.

(56) References Cited

U.S. PATENT DOCUMENTS

| 11,331,791 B2 * | 5/2022 | Zhao ............... B25J 17/0283 |
| 2003/0151379 A1 | 8/2003 | Gosselin et al. |

(Continued)

FOREIGN PATENT DOCUMENTS

| CN | 1775487 A   | 5/2006 |
| CN | 103302661 A | 9/2013 |

(Continued)

OTHER PUBLICATIONS

International Search Report issued in corresponding international application No. PCT/CN2017/087679, dated Mar. 15, 2018.

(Continued)

*Primary Examiner* — Joseph Brown

(57) ABSTRACT

A 2 DOFs decoupling parallel mechanism provided by the present disclosure comprises a fixed platform, a rotation assembly, a moving platform, an arc kinematic chain, and an arc rod. In the 2 DOFs decoupling parallel mechanism, the rotation assembly can drive the moving platform to rotate by 360 degrees around a direction being perpendicular to the fixed platform, the arc rod reciprocates along the tangential direction of the arc kinematic chain to enable the moving platform to rotate around an axis of a plane where the arc kinematic chain is located. In this way, the rotations of the moving platform in two directions are respectively driven by driving units in two directions and being independent from each other, such that the two rotation actions of the mechanism have decoupling capability.

5 Claims, 2 Drawing Sheets

(56) References Cited

U.S. PATENT DOCUMENTS

| | | | |
|---|---|---|---|
| 2009/0084219 A1* | 4/2009 | Rosheim | F16M 11/18 74/5 R |
| 2012/0042628 A1* | 2/2012 | Rosheim | B25J 17/0275 60/232 |
| 2019/0375117 A1* | 12/2019 | Wang | B25J 17/0266 |
| 2019/0389050 A1* | 12/2019 | Zhao | B25J 17/0216 |
| 2020/0189093 A1* | 6/2020 | Zhao | B25J 9/0045 |

FOREIGN PATENT DOCUMENTS

| | | | | |
|---|---|---|---|---|
| CN | 104827463 A | | 8/2015 | |
| CN | 104985587 A | * | 10/2015 | |
| CN | 105538296 A | * | 5/2016 | B25J 9/006 |
| CN | 106426091 A | | 2/2017 | |
| CN | 106671067 A | * | 5/2017 | |
| CN | 106903671 A | * | 6/2017 | B25J 9/003 |
| CN | 106965161 A | * | 7/2017 | B25J 17/00 |
| CN | 107351059 A | | 11/2017 | |
| CN | 108145695 A | * | 6/2018 | A61B 34/30 |
| CN | 108161901 A | * | 6/2018 | B25J 9/0045 |
| CN | 108356802 A | * | 8/2018 | B25J 9/0072 |
| CN | 110405727 A | * | 11/2019 | |
| CN | 112405499 A | * | 2/2021 | |

OTHER PUBLICATIONS

Written Opinion of the international Searching Authority for No. PCT/CN2017/087679.

* cited by examiner

2 DEGREE-OF-FREEDOMS DECOUPLING PARALLEL MECHANISM

TECHNICAL FIELD

The present disclosure relates to the technical field of parallel mechanisms, and in particular, to a 2 degree-of-freedoms (DOFs) decoupling parallel mechanism.

BACKGROUND

Since a parallel robot was first proposed in 1938, it has been widely used in various fields of society because of its characteristics such as large rigidity, strong bearing capacity, small error, high precision, small self-weight load ratio, good dynamic performance, easy control, and so on. At present, common parallel mechanisms include 2 DOFs, 3 DOFs, 4 DOFs, and 6 DOFs parallel mechanisms; currently, 3 DOF parallel mechanisms are the most researched and the most widely used type of less freedom parallel mechanisms. They can be classified into four categories according to the type of moving platform freedom: three-rotation parallel mechanisms, two-rotation and one-translation parallel mechanisms, one-rotation and two-translation parallel mechanisms, and three-translation parallel mechanisms. Wherein, spherical parallel mechanisms belong to three-rotation parallel mechanisms, which can realize any rotation around a spherical center of a movement spherical surface of a reference point of a moving platform. When such a mechanism moves, all points on a moving platform of the mechanism surround a spherical center and rotate in a fixed radius. Advantages of spherical parallel connection with respect to general parallel mechanisms are larger working space, flexibility, reliability, not being prone to interfere, etc.

For example, a bias output 3 DOFs spherical parallel mechanism with a central spherical hinge (CN101306534) proposed by Professor GAO, Feng et al. of Yanshan University has typical characteristics of a mechanism in a 3-RRR type. It realizes rotations in three directions around a fixed center.

Professor HUANG, Zhen of Yanshan University proposes a parallel mechanism with a symmetrical structure and without accompanying motion (CN102962840). It can continuously rotate around any axis or any point in the middle symmetrical plane of fixed and moving platforms, and thus can avoid occurrence of accompanying motions effectively.

SHEN, Long of Shanghai University proposes an antenna structure system with a spherical 3 DOFs parallel mechanism (CN101924266). It has larger working space in comparison with general 3 DOFs spherical mechanisms.

LIN, Rongfu et al. of Shanghai Jiao Tong University proposes a 3 DOFs spherical parallel mechanism with arc prismatic pairs (CN104827463). It adopts an arc prismatic pair manner to realize that rotations in three directions of a moving platform around a middle point of an arc.

Configurations of prismatic pairs of kinematic chains of these mechanisms generally include RR or RRR, and axes of these prismatic pairs intersect at one point to realize 3 DOFs motions of a moving platform. Wherein, LIN Rongfu of Shanghai Jiao Tong University adopts an arc prismatic pair, through an arc configuration of the prismatic pair, a moving platform is restricted by forces in three directions and can only rotate in three directions around a center of an arc, and thus does not have partial decoupling capability.

SUMMARY

In view of this, it is necessary to provide a 2 DOFs decoupling parallel mechanism having motion decoupling capability.

A 2 DOFs decoupling parallel mechanism comprises: a fixed platform, a rotation assembly mounted on the fixed platform, a moving platform rotatably connected with one end of the rotation assembly, an arc kinematic chain fixedly connected with a side of the rotation assembly, and an arc rod having one end received in an inner cavity formed by the arc kinematic chain and being reciprocally movable along a tangential direction of the arc kinematic chain; wherein, another end of the arc rod is fixedly connected to a side edge of the moving platform, the rotation assembly is capable of driving the moving platform to rotate by 360 degrees around a direction being perpendicular to the fixed platform; the arc rod reciprocates along the tangential direction of the arc kinematic chain to enable the moving platform to rotate around an axis of a plane where the arc kinematic chain is located.

In some embodiments, the rotation assembly includes a first driving unit and a rotation unit, the first driving unit includes a first driving motor fixed on the fixed platform and a first driving gear fixedly connected with the first driving motor, the rotation unit includes a support fixed on the fixed platform and a rotation element sheathed on the support, the rotation element defines a first teeth profile engaging with the first driving gear.

In some embodiments, axes of the first driving motor and of the support are parallel to each other.

In some embodiments, a second driving unit is mounted on an end of the rotation element, the second driving unit includes a second driving motor and a driving screw rod connected with the second driving motor, a threaded sleeve is sheathed on the driving screw rod, and one end of the threaded sleeve is rotatably connected with the moving platform through a spherical hinge.

In some embodiments, a connection rod is disposed between the arc rod and the moving platform, the connection rod has one end passing through an aperture defined in an end of the arc rod and another end fixedly connected to a side edge of the moving platform, and an axis of the connection rod does not pass through a center of the spherical hinge.

In some embodiments, a restriction rod is disposed between the rotation element and the moving platform, the restriction rod has one end fixedly connected with the rotation element and another end rotatably connected with the moving platform through a revolve pair.

In some embodiments, an axis of the revolve pair is perpendicular to a plane where the arc rod is located.

In some embodiments, a connection rod is disposed between the arc rod and the moving platform, the connection rod has one end passing through an aperture defined in an end of the arc rod and another end fixedly connected to a side edge of the moving platform, and an axis of the connection rod passes through a rotation center of the revolve pair.

In some embodiments, a third driving unit is mounted on a side of the arc kinematic chain, the third driving unit includes a third driving motor fixed on a side of the arc kinematic chain and a third driving gear fixedly connected with the third driving motor, and the arc rod defines a third teeth profile engaging with the third driving gear.

A 2 DOFs decoupling parallel mechanism provided by the present disclosure comprises: a fixed platform, a rotation assembly mounted on the fixed platform, a moving platform rotatably connected with one end of the rotation assembly, an arc kinematic chain fixedly connected with a side of the rotation assembly, and an arc rod having one end received in an inner cavity formed by the arc kinematic chain and being reciprocally movable along a tangential direction of the arc kinematic chain; wherein, another end of the arc rod is fixedly connected to a side edge of the moving platform. In the 2 DOFs decoupling parallel mechanism, the rotation assembly can drive the moving platform to rotate by 360 degrees around a direction being perpendicular to the fixed platform, the arc rod reciprocates along the tangential direction of the arc kinematic chain to enable the moving platform to rotate around an axis of a plane where the arc kinematic chain is located. In this way, the rotations of the moving platform in two directions are respectively driven by driving units in two directions and being independent from each other, such that the two rotation actions of the mechanism have decoupling capability.

DETAILED DESCRIPTION

In order to make the objects, technical solutions and advantages of the present disclosure be more clear, the present disclosure will be further described in detail below with reference to the accompanying drawings and embodiments. It should be understood that the specific embodiments described herein are merely intended to illustrate the present disclosure and are not intended to limit the present disclosure.

Figure 1:
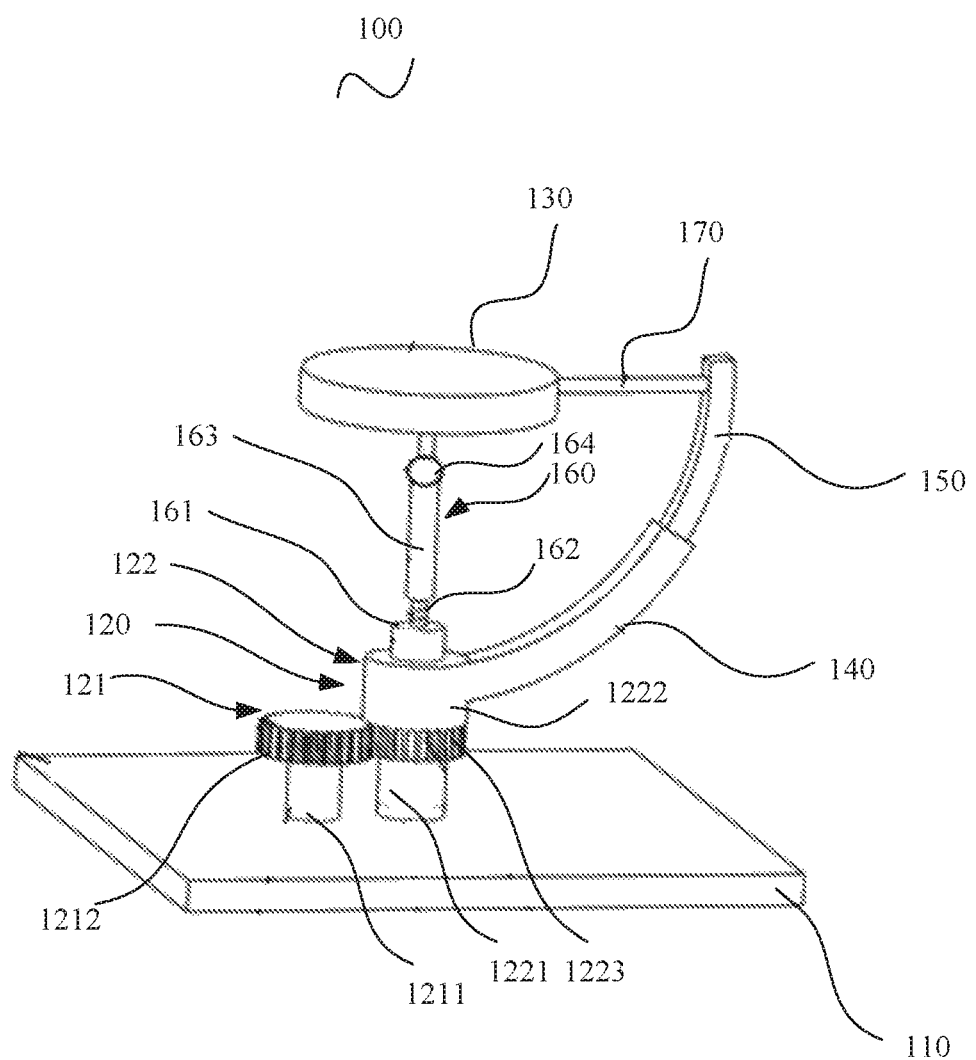
FIG. 1 is a structural schematic view of a 2 DOFs decoupling parallel mechanism provided by one embodiment of the present disclosure.

Referring to FIG. 1, a 2 DOFs decoupling parallel mechanism 100 of one embodiment of the present disclosure comprises a fixed platform 110, a rotation assembly 120, a moving platform 130, an arc kinematic chain 140, and an arc rod 150.

Wherein, the rotation assembly 120 is mounted on the fixed platform 110, the moving platform 130 is hinged with one end of the rotation assembly 120, the arc kinematic chain 140 is fixedly connected with a side of the rotation assembly 120, one end of the arc rod 150 is received in an inner cavity formed by the arc kinematic chain 140, and the arc rod 150 can reciprocate along a tangential direction of the arc kinematic chain 140; another end of the arc rod 150 is fixedly connected with a side edge of the moving platform 130.

Understandably, in the 2 DOFs decoupling parallel mechanism 100 provided by the present disclosure, the rotation assembly 120 can drive the moving platform 130 to rotate by 360 degrees around a direction being perpendicular to the fixed platform 110, the arc rod 150 reciprocates along the tangential direction of the arc kinematic chain 140 to enable the moving platform 130 to rotate around an axis of a plane where the arc kinematic chain 140 is located. In this way, the rotations of the moving platform 130 in two directions are respectively driven by driving units in two directions and being independent from each other, such that the two rotation actions of the mechanism have decoupling capability.

In a preferred embodiment of the present disclosure, the structure of the fixed platform 110 can be a square plate. It can be understood that the structure of the fixed platform 110 can be designed into a circular plate, a rectangular plate, or the like according to requirements.

In a preferred embodiment of the present disclosure, the rotation assembly 120 includes a first driving unit 121 and a rotation unit 122, and the specific solution is as follows.

The first driving unit 121 includes a first driving motor 1211 fixed on the fixed platform 110 and a first driving gear 1212 fixedly connected with the first driving motor 1211.

The rotation unit 122 includes a support 1221 fixed on the fixed platform 110 and a rotation element 1222 sheathed on the support 1221, the rotation element 1222 defines a first teeth profile 1223 engaging with the first driving gear 1212, and one end of the rotation element 1222 is hinged with the moving platform 130.

Preferably, axes of the first driving motor 1211 and of the support 1221 are parallel to each other.

Referring to FIG. 1, in one embodiment provided by the present disclosure, a second driving unit 160 is mounted on an end of the rotation element 1222, the second driving unit 160 includes a second driving motor 161 and a driving screw rod 162 connected with the second driving motor 161, a threaded sleeve 163 is sheathed on the driving screw rod 162, and one end of the threaded sleeve 163 is rotatably connected with the moving platform 130 through a spherical hinge 164.

Understandably, the driving screw rod 162 is driven by the second driving motor 161, through the screw rod transmission method, the thread sleeve 163 is enabled to reciprocate along an axis of the driving screw rod 162, and it is possible to enable the moving platform 130 to rotate around the spherical hinge 164.

Preferably, a connection rod 170 is disposed between the arc rod 150 and the moving platform 130, the connection rod 170 has one end passing through an aperture defined in an end of the arc rod 150 and another end fixedly connected to a side edge of the moving platform 130, and an axis of the connection rod 150 does not pass through a center of the spherical hinge.

Figure 2:
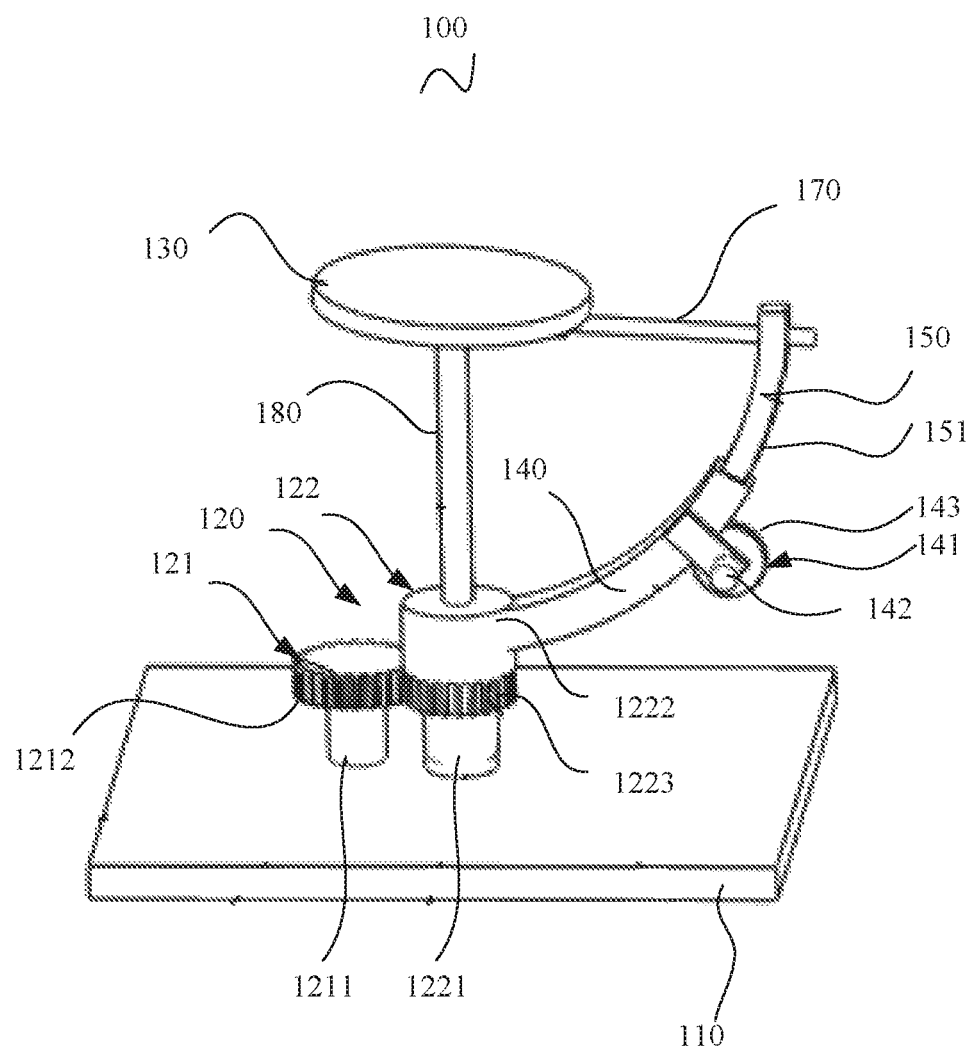
FIG. 2 is a structural schematic view of a 2 DOFs decoupling parallel mechanism provided by another embodiment of the present disclosure.

Referring to FIG. 2, in another embodiment provided by the present disclosure, a restriction rod 180 is disposed between the rotation element 122 and the moving platform 130, the restriction rod 180 has one end fixedly connected with the rotation element 122 and another end rotatably connected with the moving platform 130 through a revolve pair (not shown).

Preferably, an axis of the revolve pair is perpendicular to a plane where the arc rod 150 is located.

Preferably, a connection rod 170 is disposed between the arc rod 150 and the moving platform 130, the connection rod 170 has one end passing through an aperture defined in an end of the arc rod 150 and another end fixedly connected to a side edge of the moving platform 130, and an axis of the connection rod 170 passes through a rotation center of the revolve pair.

Understandably, in the above embodiment provided by the present disclosure, a moment of force output by the first driving motor 1211 drives the first teeth profile 1223 to rotate around an axis of the support 1221 through gear engagement of the first driving gear 1212; under actions of the arc kinematic chain 140 and the connection rod 170, the moving platform 130 is enabled to rotate by 360 degrees around an axis of the support 1221.

In the above embodiments provided by the present disclosure, the arc kinematic chain 140 can be an arc tubular structure. A cross section of the cavity of the arc kinematic chain 140 can be a circular, oval, or square structure. A cross section of the arc rod 150 can be a circular, oval, or square structure matching with the cavity structure of the arc kinematic chain 140.

Understandably, one end of the arc rod 150 is received in an inner cavity formed by the arc kinematic chain 140, and the arc rod 150 can reciprocate along a tangential direction of the arc kinematic chain 140, such that the moving platform 130 rotates around an axis of a plane where the arc kinematic chain 140 is located.

In one preferred embodiment of the present disclosure, a third driving unit 141 can be mounted on a side of the arc kinematic chain 140, the third driving unit 141 includes a third driving motor 142 fixed on a side of the arc kinematic chain 140 and a third driving gear 143 fixedly connected with the third driving motor 142, and the arc rod 150 defines a third teeth profile 151 engaging with the third driving gear 143. Understandably, an output end of the third driving motor 142 is linked with the third driving gear 143 through a coupling, and a side of the arc rod 150 defines a side gap, such that the third driving gear 143 can engage with the third teeth features of the third teeth profile 151.

Understandably, the third driving motor 142 on the arc kinematic chain 140 drives the third driving gear 143 to rotate, and thus drives the third teeth profile 151 defined on the arc rod 150 and engaging with the third driving gear 143 to rotate, such that the arc rod 150 reciprocates along an arc tangential direction in the cavity of the arc kinematic chain 140, and the moving platform 130 is enabled to rotate around an axis passing through a center of the spherical hinge and being perpendicular to a plane where the arc kinematic chain 140 is located.

In the 2 DOFs decoupling parallel mechanism 100 provided by the present disclosure, the rotation assembly 120 can drive the moving platform 130 to rotate by 360 degrees around a direction being perpendicular to the fixed platform 110, the arc rod 150 reciprocates along the tangential direction of the arc kinematic chain 140 to enable the moving platform 130 to rotate around an axis of a plane where the arc kinematic chain 140 is located. In this way, the rotations of the moving platform 130 in two directions are respectively driven by driving units in two directions and being independent from each other, such that the two rotation actions of the mechanism have decoupling capability.

The above 2 DOFs decoupling parallel mechanism 100 has a simple and reliable structure, strong driving capability, high flexibility, and the movable platform 130 moving stably, and can be applied in fields such as virtual axis machine tools, industrial robots, aviation simulation equipments, medical equipments, etc.

The above are only preferred embodiments of the present disclosure, and it should be noted that those skilled in the art can also make some improvements and embellishments without departing from the principles of the present disclosure, and these improvements and embellishments should also be considered as the protection scope of the present disclosure.

What is claimed is:

1. A 2 DOFs decoupling parallel mechanism, comprising: a fixed platform, a rotation assembly mounted on the fixed platform, a moving platform rotatably connected with one end of the rotation assembly, an arc kinematic chain fixedly connected with a side of the rotation assembly, and an arc rod having one end received in an inner cavity formed by the arc kinematic chain and being reciprocally movable along a tangential direction of the arc kinematic chain; wherein, another end of the arc rod is fixedly connected to a side edge of the moving platform, the rotation assembly is capable of driving the moving platform to rotate by 360 degrees around a direction being perpendicular to the fixed platform; the arc rod reciprocates along the tangential direction of the arc kinematic chain to enable the moving platform to rotate around an axis of a plane where the arc kinematic chain is located.

2. The 2 DOFs decoupling parallel mechanism according to claim", wherein, the rotation assembly includes a first driving unit and a rotation unit, the first driving unit includes a first driving motor fixed on the fixed platform and a first driving gear fixedly connected with the first driving motor, the rotation unit includes a support fixed on the fixed platform and a rotation element sheathed on the support, the rotation element defines a first teeth profile engaging with the first driving gear.

3. The 2 DOFs decoupling parallel mechanism according to claim 2, wherein, axes of the first driving motor and of the support are parallel to each other.

4. The 2 DOFs decoupling parallel mechanism according to claim 2, wherein, a second driving unit is mounted on an end of the rotation element, the second driving unit includes a second driving motor and a driving screw rod connected with the second driving motor, a threaded sleeve is sheathed on the driving screw rod, and one end of the threaded sleeve is rotatably connected with the moving platform through a spherical hinge.

5. The 2 DOFs decoupling parallel mechanism according to claim 4, wherein, a connection rod is disposed between the arc rod and the moving platform, the connection rod has one end passing through an aperture defined in an end of the arc rod and another end fixedly connected to the side edge of the moving platform, and an axis of the connection rod does not pass through a center of the spherical hinge.

* * * * *